(12) United States Patent
Foster et al.

(10) Patent No.: US 7,517,296 B2
(45) Date of Patent: Apr. 14, 2009

(54) VARIABLE MOTOR/GENERATOR COOLING CONTROL SYSTEM FOR ELECTRICALLY VARIABLE HYBRID VEHICULAR TRANSMISSIONS

(75) Inventors: Michael D. Foster, Carmel, IN (US); Charles F. Long, Pittsboro, IN (US); Michael L. Duhaime, Northville, MI (US)

(73) Assignee: General Motors Corporation, Detroit, MI (US)

( * ) Notice: Subject to any disclaimer, the term of this patent is extended or adjusted under 35 U.S.C. 154(b) by 454 days.

(21) Appl. No.: 11/115,035

(22) Filed: Apr. 26, 2005

(65) Prior Publication Data

US 2006/0240939 A1    Oct. 26, 2006

(51) Int. Cl.
*F16H 57/04*    (2006.01)

(52) U.S. Cl. .................. 475/161; 62/259.2; 475/116; 475/159; 477/3; 477/5

(58) Field of Classification Search .............. 62/259.2; 475/116, 161, 159; 251/30.01; 180/65.1; 477/3, 5
See application file for complete search history.

(56) References Cited

U.S. PATENT DOCUMENTS

| | | | | |
|---|---|---|---|---|
| 2,650,616 | A * | 9/1953 | Wilkinson et al. | 251/30.01 |
| 5,010,991 | A * | 4/1991 | Tsukamoto et al. | 192/3.3 |
| 5,415,603 | A * | 5/1995 | Tuzuki et al. | 477/5 |
| 5,643,125 | A * | 7/1997 | Long et al. | 475/127 |
| 5,669,473 | A * | 9/1997 | Long et al. | 192/3.3 |
| 5,685,408 | A * | 11/1997 | Long | 192/3.58 |
| 5,911,244 | A * | 6/1999 | Long et al. | 137/625.64 |
| 6,244,385 | B1 * | 6/2001 | Tsubata et al. | 184/6.4 |
| 6,382,248 | B1 * | 5/2002 | Long et al. | 137/557 |
| 6,383,114 | B1 * | 5/2002 | Hoshiya et al. | 477/2 |
| 6,394,210 | B2 * | 5/2002 | Matsuda et al. | 180/68.1 |
| 6,494,801 | B1 * | 12/2002 | Ohtake et al. | 475/5 |
| 6,835,151 | B2 * | 12/2004 | Fujimine et al. | 475/116 |
| 2002/0060099 | A1 * | 5/2002 | Takenaka et al. | 180/65.1 |
| 2002/0086759 | A1 * | 7/2002 | Imai et al. | 475/116 |
| 2002/0173895 | A1 * | 11/2002 | Kitaori et al. | 701/51 |
| 2004/0124722 | A1 * | 7/2004 | Uchida et al. | 310/54 |
| 2004/0220015 | A1 * | 11/2004 | Murakami et al. | 477/15 |

FOREIGN PATENT DOCUMENTS

JP    2004-346831 A    12/2004

\* cited by examiner

*Primary Examiner*—Cheryl J Tyler
*Assistant Examiner*—Joseph Corrigan

(57) ABSTRACT

The present invention provides a control system employing a single solenoid valve operable to provide a variable fluid flow to effect cooling if the motor/generator assemblies contained within an electrically variable hybrid transmission. The control system of the present invention selectively controls the cooling of at least one motor/generator assembly of an electronically variable hybrid transmission by selectively controlling valves of various types and configurations.

9 Claims, 10 Drawing Sheets

(12) United States Patent
US 7,517,296 B2

VARIABLE MOTOR/GENERATOR COOLING CONTROL SYSTEM FOR ELECTRICALLY VARIABLE HYBRID VEHICULAR TRANSMISSIONS

TECHNICAL FIELD

The present invention relates to a control system for selectively controlling the fluid flow rate to effect the cooling of at least one motor/generator assembly of an electrically variable hybrid transmission.

BACKGROUND OF THE INVENTION

An electrically variable hybrid transmission has been proposed for vehicles to improve fuel economy and reduce exhaust emissions. The electrically variable transmission splits mechanical power between an input shaft and an output shaft into a mechanical power path and an electrical power path by means of differential gearing. The mechanical power path may include clutches and additional gears. The electrical power path may employ two electrical power units, or motor/generator assemblies, each of which may operate as a motor or a generator. With an electrical storage system, such as a battery, the electrically variable transmission can be incorporated into a propulsion system for a hybrid electric vehicle.

The hybrid propulsion system uses an electrical power source, such as batteries, as well as an engine power source. The electrical power source is connected with the motor/generator units through an electronic control unit, which distributes the electrical power as required. The electronic control unit also has connections with the engine and vehicle to determine the operating characteristics, or operating demand, so that the motor/generator assemblies are operated properly as either a motor or a generator. When operating as a generator, the motor/generator assembly accepts power from either the vehicle or the engine and stores power in the battery, or provides that power to operate another electrical device or another motor/generator assembly.

Additionally, the stators for each electric motor/generator assembly contained within the electrically variable hybrid transmission may each require differing rates of cooling that are dependent on the duty cycle of each motor/generator. The cooling of the stator is typically performed by bathing the stator with a calibrated flow rate of transmission fluid allowing the heat generated by operation of the motor/generators to be transferred to the fluid. A continuously high cooling rate is simple to implement, however, additional pump loads and spin losses may produce a decrease in efficiency over a selectively variable motor/generator cooling system.

SUMMARY OF THE INVENTION

The present invention provides a cooling control system employing a single solenoid valve, to selectively control the fluid flow rate to the motor/generator cooling system of an electrically variable hybrid transmission.

Accordingly, the present invention provides a variable motor/generator cooling control system for an electrically variable hybrid vehicular transmission having a solenoid valve, a line pressure source of pressurized fluid, at least one motor/generator; and at least one relay valve. The relay valve has a first position and a second position which is controlled by the solenoid valve, and is operable to selectively distribute the pressurized fluid from the line source to the at least one motor/generator for cooling.

The variable motor/generator cooling control system of the present invention may also include a motor/generator feed passage having a plurality of branches of varying restriction to place the at least one motor/generator in selective fluid communication with the relay valve. Orifices disposed therein may effect the restriction in the plurality of branches. The plurality of branches of the present invention may include a first branch and a second branch. The first branch has no orifice, the second branch has multiple orifices, and the motor/generator feed passage has a single orifice. The relay valve may communicate the pressurized fluid from the line pressure source at one flow rate to the at least one motor/generator via one of the plurality of branches when the relay valve is in the first position. Alternately, the relay valve may distribute the pressurized fluid from the line pressure source at another flow rate to the at least one motor/generator via another of the plurality of branches when the relay valve is in the second position.

The solenoid valve may control the at least one relay valve by selectively, variably pressurizing a control passage. The solenoid valve may be a variable pressure type solenoid valve. Additionally, the present invention may provide a multiplex valve having a first position and a second position. The multiplex valve is operable to selectively distribute the pressure within the control passage to the at least one relay valve when the multiplex valve is in the first position. Alternately, the multiplex valve will selectively distribute the pressure within the control passage to an additional component of the variable motor/generator cooling control system when the multiplex valve is in the second position. The additionally component may be a damper lock out clutch trim valve.

A second embodiment of the present invention provides a variable motor/generator cooling control system for an electrically variable hybrid vehicular transmission having a relay valve having a first position and a second position, a regulator valve, a line pressure source of pressurized fluid, and a plurality of motor/generators each of which is individually in selective fluid communication with the regulator valve via one of a plurality of feed passages. A solenoid valve is also provided and is operable to control the relay valve and the regulator valve to selectively communicate the pressurized fluid from the line pressure source to each of the plurality of motor/generators for cooling. The solenoid valve of the present invention may be a variable pressure type solenoid valve operable to control the relay valve and the regulator valve by selectively and variably pressurizing a control passage.

Each of the plurality of feed passages may include at least one orifice. Additionally, the line pressure source may be in fluid communication with the regulator valve via a line pressure source passage. The line pressure passage may include an orifice.

The present invention also provides a variable motor/generator cooling control system for an electrically variable hybrid vehicular transmission comprising having at least one motor/generator, a line pressure source of pressurized fluid, and at least one relay valve operable to provide the pressurized fluid from the line pressure source to the at least one motor/generator for cooling. The variable motor/generator cooling control system also includes a solenoid valve operable to control the relay valve by selectively and variably pressurizing a control passage. The solenoid valve may be a variable pressure type solenoid valve. The control system may also include a regulator valve disposed between, and in selective fluid communication with, the at least one motor/generator and the at least one relay valve.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
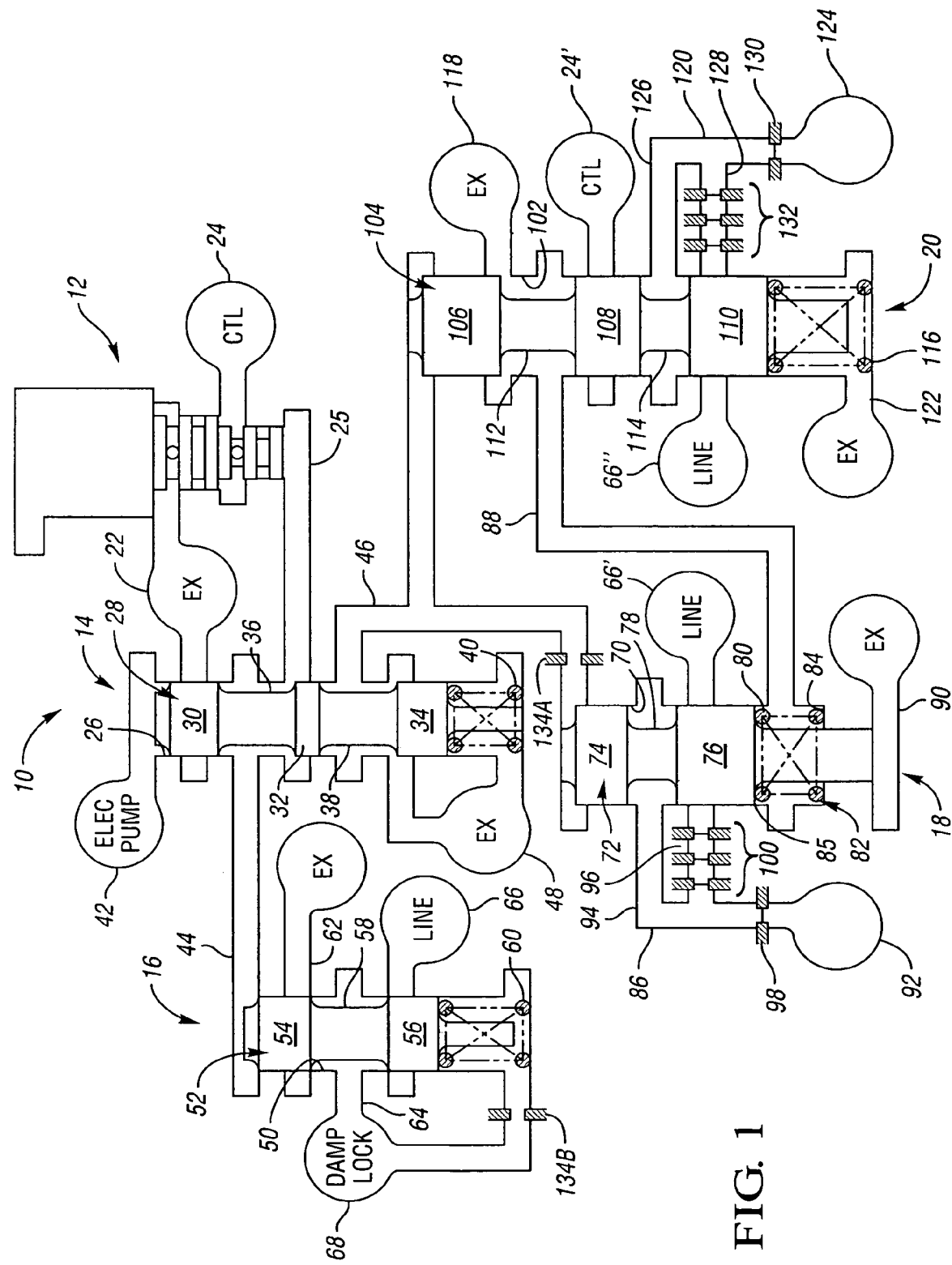
FIG. 1 is an exemplary schematic diagram of a variable motor/generator cooling system for an electrically variable hybrid transmission illustrating an engine off operating condition.

Referring to the drawings, wherein like characters represent the same or corresponding parts throughout the several views, there is seen in FIGS. 1 through 5 a multiplexed control system 10 having a solenoid valve 12, a multiplex valve 14, a damper trim valve 16, a relay valve 18, and a relay valve 20. The solenoid valve 12 is a variable pressure-type solenoid valve that may include a variable bleed or a pulse width modulated solenoid valve. Those skilled in the art of control systems will appreciate that there may be other types of solenoid valves compatible with the multiplexed control system 10 of the present invention. The solenoid valve 12 is a normally low type in that the solenoid valve 12 will not allow the passage of pressurized fluid if electrical power to the solenoid valve 12 is discontinued. However, a normally high type may be used depending on the application and the desired default state of the multiplexed control system 10 upon electrical power interruption.

The solenoid valve 12 is in fluid communication with an exhaust passage 22, a control pressure source 24, and a control passage 25. The exhaust passage 22 ensures that pressurized fluid is evacuated from within the solenoid valve 12 upon deactuation of the solenoid valve 12. The control pressure source 24 provides a pressurized fluid signal to allow the control passage 25 to be selectively pressurized at varying pressure levels by the actuation of the solenoid valve 12.

The multiplex valve 14 has a bore 26 and a valve spool 28 slidably disposed therein. The valve spool 28 has lands 30, 32, and 34. Additionally, a valley 36 is situated between lands 30 and 32, while a valley 38 is situated between lands 32 and 34. The valve spool 28 is biased within bore 26 by a spring 40. The multiplex valve 14 is in fluid communication with an auxiliary pressure source 42, the exhaust passage 22, a damper trim valve control passage 44, the control passage 25, a motor/generator control passage 46, and an exhaust passage 48. The valve spool 28 operates to selectively open and block each of these passages depending on the position of the valve spool 28 within the bore 26.

The damper trim valve 16 has a bore 50 and a valve spool 52 slidably disposed therein. The valve spool 52 has lands 54 and 56, with a valley 58 situated therebetween. The valve spool 52 is biased within bore 50 by a spring 60. The damper trim valve 16 is in fluid communication with the damper trim valve control passage 44, an exhaust passage 62, a damper lock-out clutch feed passage 64, and a line pressure source 66. The valve spool 52 operates to selectively open and block each of these passages depending on the position of the valve spool 52 within the bore 50. The damper lock-out clutch feed passage 64 is the conduit through which pressurized fluid will selectively flow to effect engagement of a damper lock-out clutch 68.

The relay valve 18 has a bore 70 and a valve spool 72 slidably disposed therein. The valve spool 72 has lands 74 and 76, with a valley 78 situated therebetween. The valve spool 72 is biased within bore 70 by a spring 80. The spring 80 is contained within a spring chamber 82 formed by the land 76, the bore 70, and an end wall 84. The land 76 has a differential area 85 that is operable to provide a desired pressure differential between opposite ends of the valve spool 72. The relay valve 18 is in fluid communication with the motor/generator control passage 46, a motor/generator A cooling feed passage 86, a line pressure source 66', a differential pressure passage 88, and an exhaust passage 90. The valve spool 72 operates to selectively open or block each of these passages depending on the position of the valve spool 72 within the bore 70.

The motor/generator A cooling feed passage 86 is the conduit through which pressurized fluid may flow to effect cooling of motor/generator A 92. The amount of cooling flow available to motor/generator A 92 is determined by the amount of pressure provided by the line pressure source 66' as well as through which branch, 94 or 96, of the motor/generator A cooling feed passage 86 the fluid is allowed to flow. The branch 94 has a single orifice 98, which will cause a minor restriction in flow when compared to the multiple orifice set 100 of branch 96. The selection of branch 94 or 96 will ultimately depend on the position of the valve spool 72 within the bore 70.

The relay valve 20 has a bore 102 and a valve spool 104 slidably disposed therein. The valve spool 104 has lands 106, 108 and 110. Additionally, a valley 112 is situated between the lands 106 and 108, while a valley 114 is situated between the lands 108 and 110. The valve spool 104 is biased within bore 102 by a spring 116. The relay valve 20 is in fluid communication with the motor/generator control passage 46, an exhaust passage 118, the differential pressure passage 88, a control pressure source 24', a motor/generator B cooling feed passage 120, a line pressure source 66", and an exhaust passage 122. The valve spool 104 operates to selectively open or block each of these passages depending on the position of the valve spool 104 within the bore 102.

The motor/generator B cooling feed passage 120 is the conduit through which pressurized fluid may flow to effect cooling of motor/generator B 124. The amount of cooling flow available to the motor/generator B 124 is determined by the amount of pressure provided by the line pressure source 66" as well as through which branch, 126 or 128, of the motor/generator B cooling feed passage 120 the fluid is allowed to flow. The branch 126 has a single orifice 130, which will cause a relatively minor restriction in fluid flow when compared to the multiple orifice set 132 of branch 128. The selection of branch 126 or 128 will ultimately depend on the position of the valve spool 104 within the bore 102.

The line pressure sources 66, 66', and 66" are typically maintained at the same pressure, however they need not be. Likewise, the control pressure sources 24 and 24' are typically maintained at the same pressure level however they need not be. Additionally, orifices 134A and 134B may be provided as an additional measure of fluid flow control.

Electric Mode—Engine Off

In FIG. 1 there is seen an exemplary schematic diagram of the multiplexed control system 10 for selectively controlling the damper lock-out clutch 68 and the cooling of motor/generator A 92 and motor/generator B 124, illustrating the engine off operating condition. Hybrid electric vehicles may selectively energize motors by battery power to effect movement of the hybrid electric vehicle. This engine off mode is sometimes referred to as "Electric Mode". During this state of operation, an auxiliary pressure source 42, such as an electrically controlled hydraulic pump, is employed to maintain fluid pressure within the electrically variable hybrid transmission. Since operation in the "Electric Mode" is limited, and torque requirements on the motor/generators are low and brief in duration, a large amount of cooling is not required by the motor/generator A 92 and the motor/generator B 124.

The damper lock-out clutch 68 should be engaged when stopping and starting the internal combustion engine, which occurs when transitioning into and out of "Electric Mode". This clutching is required to avoid the torsional vibrations associated with an engine moving into and out of its torsional resonant point. As the vehicle enters an operating mode in which the internal combustion engine may be stopped, the auxiliary pressure source 42 is activated by the vehicle control system (not shown). This pressurized fluid from the auxiliary pressure source 42 forces the valve spool 28 of the multiplex valve 14 into a pressure set position. The valley 36 will allow fluid communication between the control passage 25 and the damper trim valve control passage 44.

The solenoid valve 12 may now precisely control the fluid pressure within the damper trim valve control passage 44 by allowing regulated fluid from the control pressure source 24 into the control passage 25. As the solenoid valve 12 permits the increase of the pressure within the damper trim valve control passage 44, the valve spool 52 of the damper trim valve 16 will move from its spring set position, as shown in FIGS. 2 through 5, to bias against the spring 60. The valve spool 52 will move into a trim position, as shown in FIG. 1, when the fluid pressure operating on land 54 overcomes the force of spring 60. At which point, the damper lock-out clutch 68 will stop exhausting fluid pressure through the damper lock-out clutch feed passage 64 into the exhaust passage 62 via the valley 58. Instead, the land 54 will block the exhaust passage 62 and the land 56 will permit pressurized fluid from the line pressure source 66 to enter the damper lock-out clutch feed passage 64 via valley 58. The increased fluid pressure within the damper lock-out clutch feed passage 64 will enable engagement of the damper lock-out clutch 68.

Concurrently, the position of the valve spool 28 within the multiplex valve 14 will cause any fluid pressure within the motor/generator control passage 46 to be exhausted by the exhaust passage 48 via valley 38. This will ensure that both the valve spool 72 of the relay valve 18 and the valve spool 104 of the relay valve 20 will remain in the spring set position thereby providing a minimal amount of cooling fluid to motor/generator A 92 and motor/generator B 124 via branch 96 and 128 respectively.

Engine On—Low Cooling Flow to Motor/Generator A and Motor/Generator B

Figure 2:
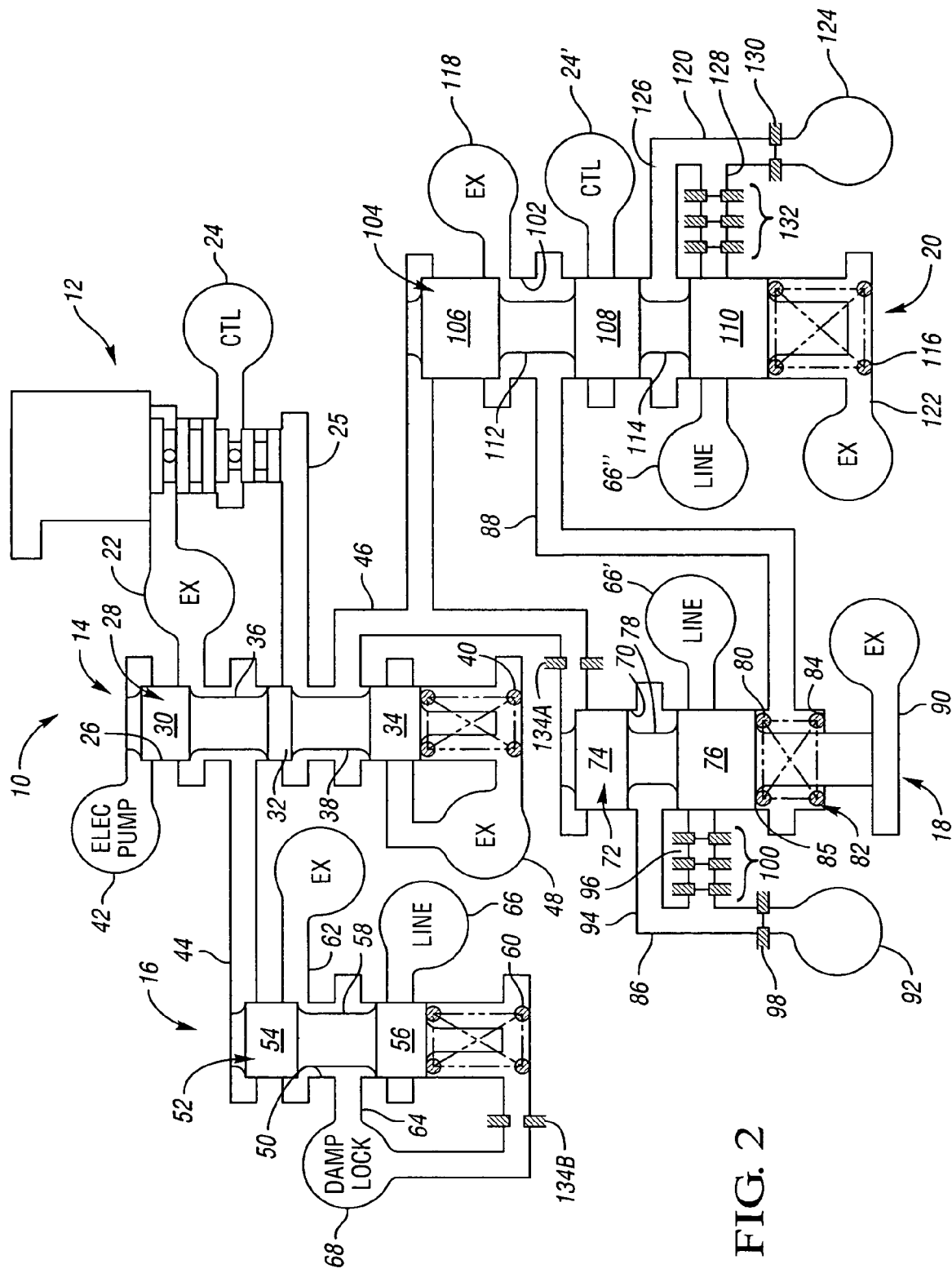
FIG. 2 is an exemplary schematic diagram of the variable motor/generator cooling system for an electrically variable hybrid transmission illustrating an engine on, low cooling flow to both motor/generator A and motor/generator B operating condition.

FIG. 2 is an exemplary schematic diagram of the multiplexed control system 10 for selectively controlling the damper lockout clutch engagement and motor/generator cooling, illustrating the engine on, low cooling flow to both the motor/generator A 92 and the motor/generator B 124 operating condition. The auxiliary pressure source 42 is turned off following engine restart thereby relieving the fluid pressure acting upon the valve spool 28 of the multiplex valve 14. The spring 40 will bias the valve spool 28 into a spring set position. The damper trim valve control passage 44 will then exhaust though the exhaust passage 22 by way of valley 36. The lack of fluid pressure acting on land 54 will allow the spring 60 to bias the valve spool 52 of the damper trim valve 16 into a spring set condition. As a result, the land 56 will move into position to block the line pressure source 66 and allow the disengagement of the damper lock-out clutch 68 by exhausting fluid pressure through the damper lock-out clutch feed passage 64 into the exhaust passage 62 via valley 58. This condition will remain for the duration of the engine on conditions.

At low pressure values within the control passage 25, both the valve spool 72 within the relay valve 18 and the valve spool 104 within the relay valve 20 will remain in the spring set position. In this state, the land 76 of the valve spool 72 will block the pressurized fluid of the line pressure source 66' from entering branch 94 of the motor/generator A feed passage 86.

Instead, the pressurized fluid from the line pressure source 66' will be directed into branch 96 where it must traverse a multiple orifice set 100 prior to entering the motor/generator A feed passage 86 and ultimately to effect cooling of motor/generator A.

Likewise, the land 110 of the valve spool 104 will block the pressurized fluid of the line pressure source 66" from entering branch 126 of the motor/generator B feed passage 120. Instead, the pressurized fluid from the line pressure source 66" will be directed into branch 128 where it must traverse a multiple orifice set 132 prior to entering the motor/generator B feed passage 120 and ultimately to effect cooling of motor/generator B 124. Additionally, with the valve spool 104 in the spring set position, the land 108 will block fluid flow from the control pressure source 24' to the differential pressure passage 88.

The high flow restriction of the multiple orifice sets 100 and 132 produce a low fluid flow rate condition within the motor/generator A feed passage 86 and the motor/generator B feed passage 120, respectively. Those skilled in the art will recognize that the flow rate may be tailored to the specific application by adjusting the amount of restriction within branches 96 and 128 and/or adjusting the pressure value of the line pressure sources 66' and 66".

Figure 3:
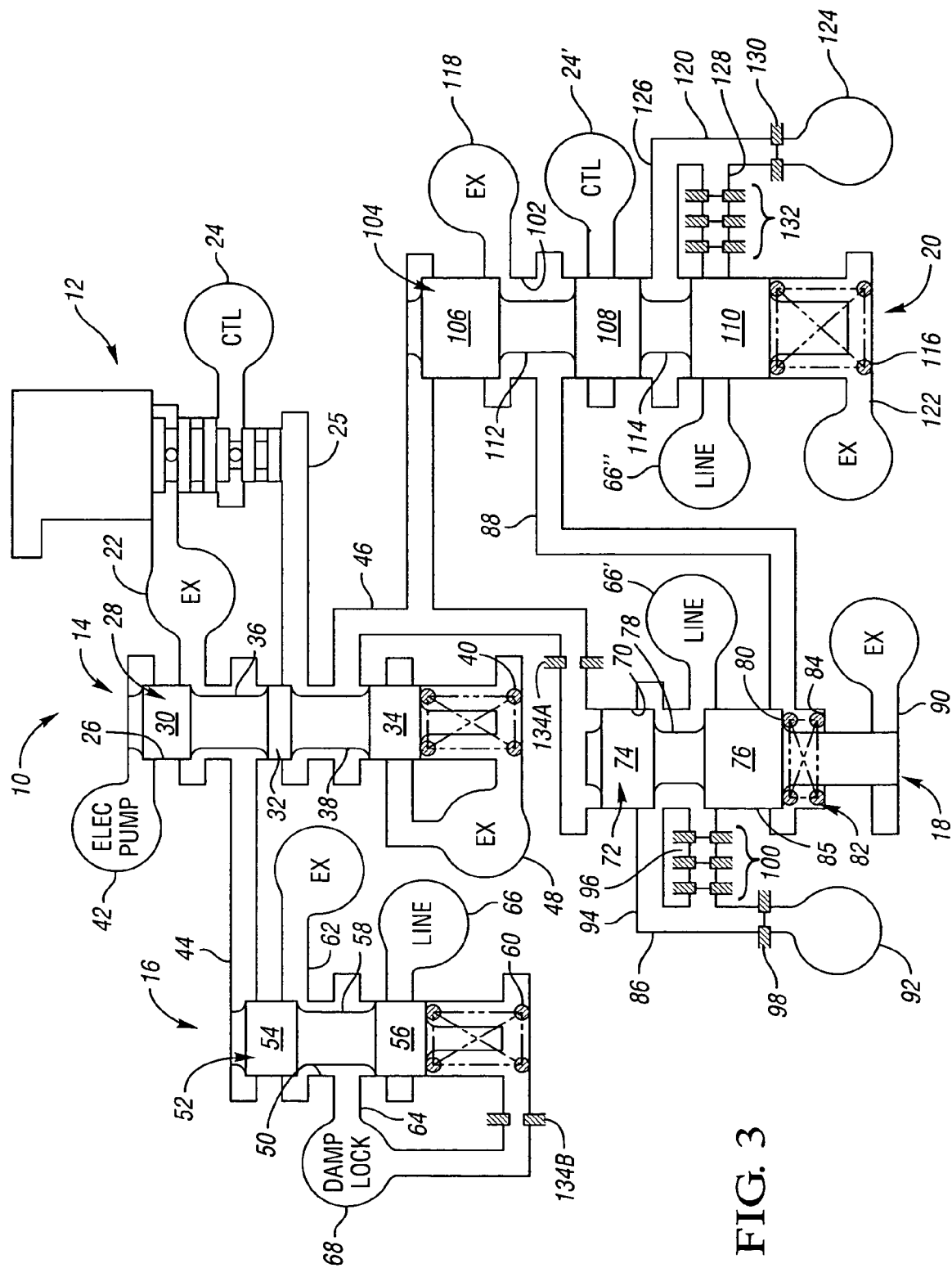
FIG. 3 is an exemplary schematic diagram of the variable motor/generator cooling system for an electrically variable hybrid transmission illustrating an engine on, high cooling flow to motor/generator A and low cooling flow to motor/generator B operating condition.

Engine On—Low Cooling Flow to Motor/Generator B and High Cooling Flow to Motor/Generator A FIG. 3 is an exemplary schematic diagram of the multiplexed control system 10 for selectively controlling the damper lockout clutch engagement and motor/generator cooling, illustrating the engine on, high cooling flow to the motor/generator A 92 and low cooling flow to the motor/generator B 124 operating condition. As the solenoid valve 12 actuates to allow greater fluid communication between the control passage 25 and the control pressure source 24, the fluid pressure will increase within both the control passage 25 and the motor/generator control passage 46. The increased pressure within the motor/generator control passage 46 will bias the valve spool 72 of the relay valve 18 into a pressure set position against the spring 80. The position of the valve spool 72 within the bore 70 will allow pressurized fluid from the line pressure source 66' to flow into both branches 94 and 96, of the motor/generator A feed passage 86, via valley 78. Motor/generator A 92 will now receive fluid though the single orifice 98 at a much higher flow rate than when the valve spool 72 is in the spring set position.

The spring 116 of the relay valve 20 is of sufficient stiffness to bias the valve spool 104 in the spring set position, thereby ensuring that the fluid flow to the motor/generator B 124 will remain at a low level. The line pressure source 66" will continue to provide pressurized fluid to the motor/generator B feed passage 120 via the branch 128. The high flow restriction of the multiple orifice set 132 will produce a low fluid flow rate condition within the motor/generator B feed passage 120.

Figure 4:
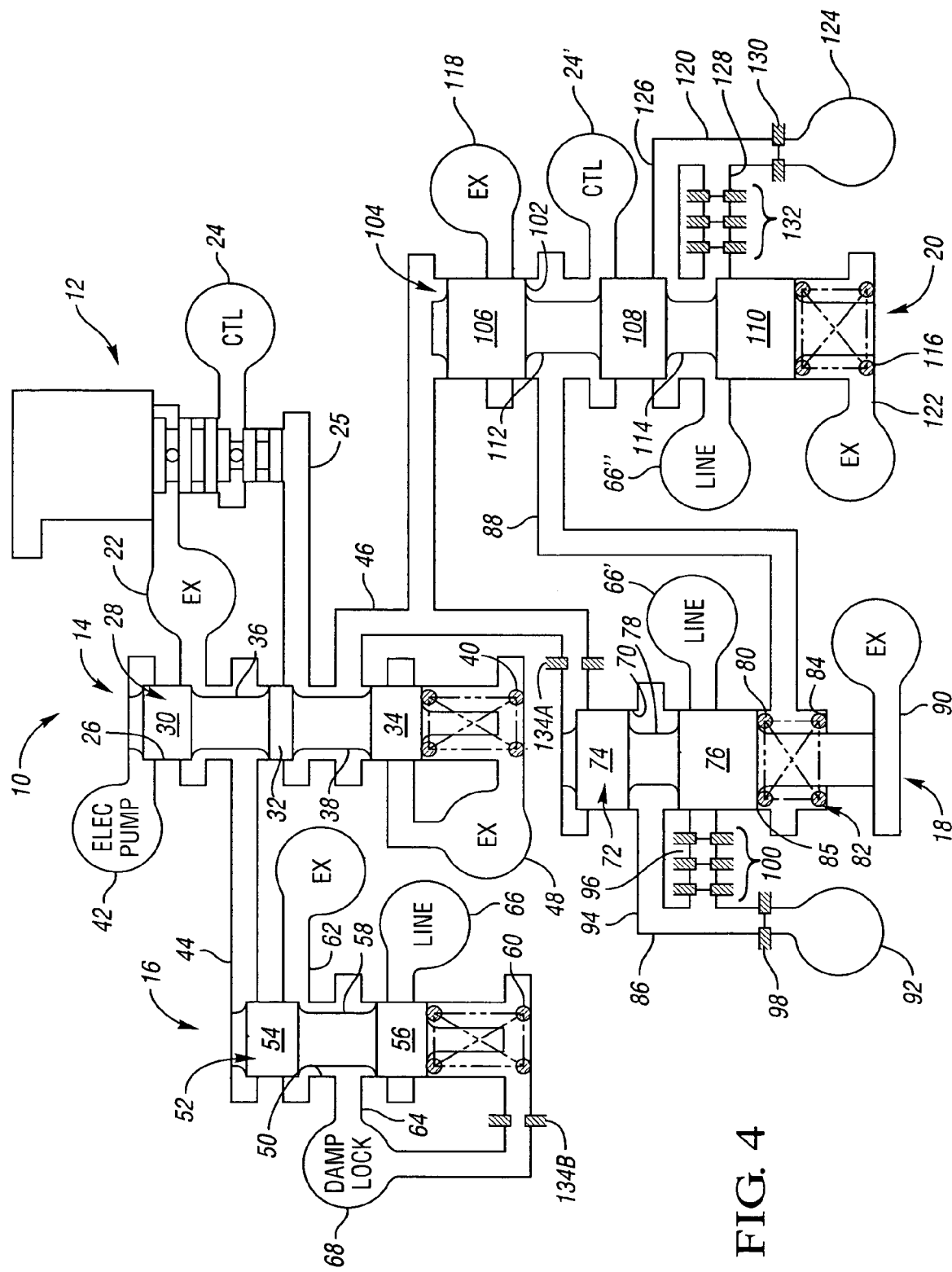
FIG. 4 is an exemplary schematic diagram of the variable motor/generator cooling system for an electrically variable hybrid transmission illustrating an engine on, low cooling flow to motor/generator A and high cooling flow to motor/generator B operating condition.

Engine On—Low Cooling Flow to Motor/Generator A and High Cooling Flow to Motor/Generator B FIG. 4 is an exemplary schematic diagram of the multiplexed control system 10 for selectively controlling the damper lockout clutch engagement and motor/generator cooling, illustrating the engine on, low cooling flow to the motor/generator A 92 and high cooling flow to the motor/generator B 124 operating condition. As the solenoid valve 12 actuates to allow even greater fluid communication between the control passage 25 and the control pressure source 24, the fluid pressure will further increase in both the control passage 25 and the motor/generator control passage 46. As a result, the fluid pressure within the motor/generator control passage 46 will bias the valve spool 104 of the relay valve 20 into a pressure set position. The position of the valve spool 104 within the bore 102 will allow pressurized fluid from the line pressure source 66" to flow into both branch 126 and 128, of the motor/generator B feed passage 120, via valley 114. Motor/generator B 124 will now receive fluid though a single orifice 130 at a much higher flow rate than when the valve spool 104 is in the spring set position.

By moving valve spool 104 into the pressure set position, the valley 112 will allow the control pressure source 24' to pressurize the differential pressure passage 88. The differential pressure passage 88 will in turn pressurize the spring chamber 82, and act upon the differential area 85 of land 76 to bias the valve spool 72 of the relay valve 18 into the spring set position. In this position, the land 76 of the valve spool 72 will block the pressurized fluid of the line pressure source 66' from entering branch 94 of the motor/generator A feed passage 86. Instead, the pressurized fluid from the line pressure source 66' will be directed into branch 96 where it must traverse the multiple orifice set 100 prior to entering the motor/generator A feed passage 86 and to ultimately effect the cooling of motor/generator A 92. The high restriction of the multiple orifice set 100 will produce a low fluid flow rate condition within the motor/generator A feed passage 86.

Figure 5:
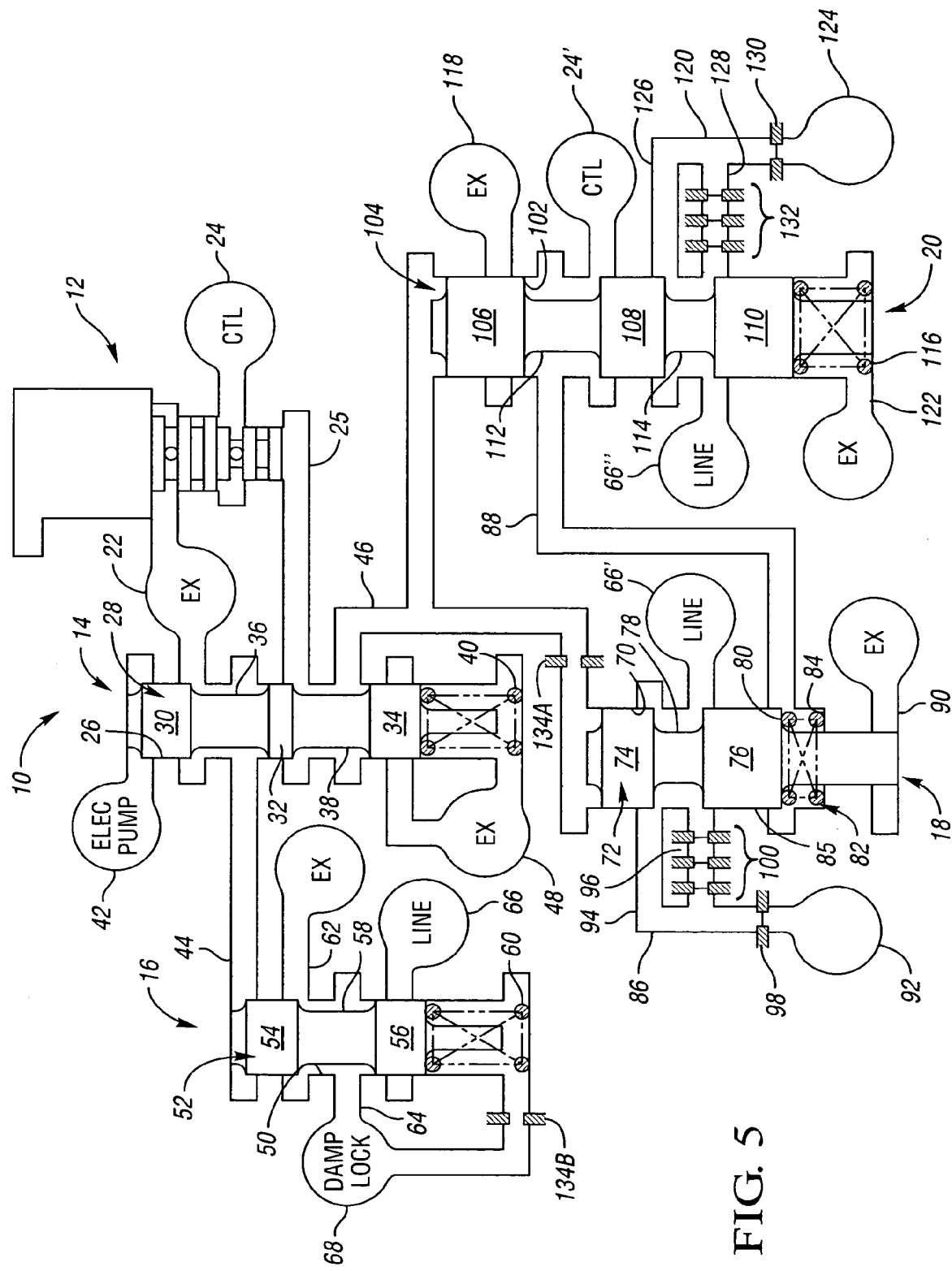
FIG. 5 is an exemplary schematic diagram of the variable motor/generator cooling system for an electrically variable hybrid transmission illustrating an engine on, high cooling flow to motor/generator A and high cooling flow to motor/generator B operating condition.

Engine On—High Cooling Flow to Motor/Generator A and High Cooling Flow to Motor/Generator B FIG. 5 is an exemplary schematic diagram of the multiplexed control system 10 for selectively controlling the damper lockout clutch engagement and motor/generator cooling, illustrating the engine on, high cooling flow to the motor/generator A 92 and high cooling flow to the motor/generator B 124 operating condition. As the solenoid valve 12 actuates to allow even greater fluid communication between the control passage 25 and the control pressure source 24, the fluid pressure will further increase within both the control passage 25 and the motor/generator control passage 46. As a result, the motor/generator control passage 46 will bias the valve spool 104 of the relay valve 20 into a pressure set position. The position of the valve spool 104 within the bore 102 will allow pressurized fluid from the line pressure source 66" into both branches 126 and 128 via valley 114. Motor/generator B 124 will now receive fluid though a single orifice 130 at a much higher flow rate than when the valve spool 104 is in the spring set position.

Additionally, The increased pressure within the motor/generator control passage 46 is now of a sufficient magnitude to bias the valve spool 72 contained within the relay valve 18 into the pressure set position by overcoming both the spring force of spring 80 and the force acting upon the differential area 85 of land 76. The position of the valve spool 72 within the bore 70 will introduce pressurized fluid from the line pressure source 66' into both branch 94 and 96 via valley 78. Motor/generator A 92 will now receive fluid though a single orifice 98 at a much higher flow rate than when the valve spool 72 is in the spring set position.

Referring now to FIGS. 6 through 10, there is seen an alternate embodiment of a variable motor/generator cooling system 210 having a solenoid valve 212, a regulator valve 214, and a relay valve 216. The solenoid valve 212 is a variable pressure-type solenoid valve and may be a variable bleed solenoid valve or pulse width modulated solenoid valve. Those skilled in the art of control systems may recognize other types of solenoid valve compatible with the variable motor/generator cooling system 210. The solenoid valve 212 is a normally low type solenoid valve. Therefore, it will not allow pressurized fluid to pass if the electrical power to the solenoid valve 212 is interrupted. A normally high type may also be used depending on the application and the desired default state of the variable motor/generator cooling system 210 upon power loss.

The solenoid valve 212 is in fluid communication with an exhaust passage 218, a control pressure source 220, and a control passage 222. The exhaust passage 218 ensures that no pressurized fluid remains within the solenoid valve 212 upon deactuation. The control pressure source 220 provides a pressurized fluid signal to allow the control passage 222 to be selectively pressurized at varying pressure levels by the actuation of the solenoid valve 212.

The regulator valve 214 has a bore 224 and a valve spool 226 slidably disposed therein. The valve spool 226 has lands 228, 230, and 232. Additionally, a valley 234 is situated between the lands 228 and 230, while a valley 236 is situated between the lands 230 and 232. The valve spool 226 is biased within bore 224 by a spring 238. The regulator valve 214 is in fluid communication with the control passage 222, a relay valve first passage 240, a relay valve second passage 242, a motor/generator A cooling feed passage 244, a motor/generator B cooling feed passage 246, and a first branch 248 and a second branch 250 of a line pressure source passage 252. The valve spool 226 operates to selectively open and block each of these passages depending on the position of the valve spool 226 within the bore 224.

The relay valve 216 has a bore 254 and a valve spool 256 slidably disposed therein. The valve spool 256 has lands 258 and 260. Additionally, a valley 262 is situated between the lands 258 and 260. The valve spool 256 is biased within bore 254 by a spring 264. The relay valve 216 is in fluid communication with the control passage 222, an exhaust passage 266, the relay valve first passage 240, and the relay valve second passage 242. The valve spool 256 operates to selectively open and block each of these passages depending on the position of the valve spool 256 within the bore 254.

A line pressure source 268 is operable to maintain the pressure within the line pressure source passage 252. The line pressure source passage 252, the motor/generator A cooling passage 244, and the motor/generator B cooling passage 246 each have a flow control orifice 270, 272, and 274 respectively disposed therein. A motor/generator A 276 is in fluid communication with the motor/generator A cooling passage 244, while a motor/generator B 278 is in fluid communication with the motor/generator B cooling passage 246.

Engine On—High Cooling Flow to Motor/Generator A and Motor/Generator B

Figure 6:
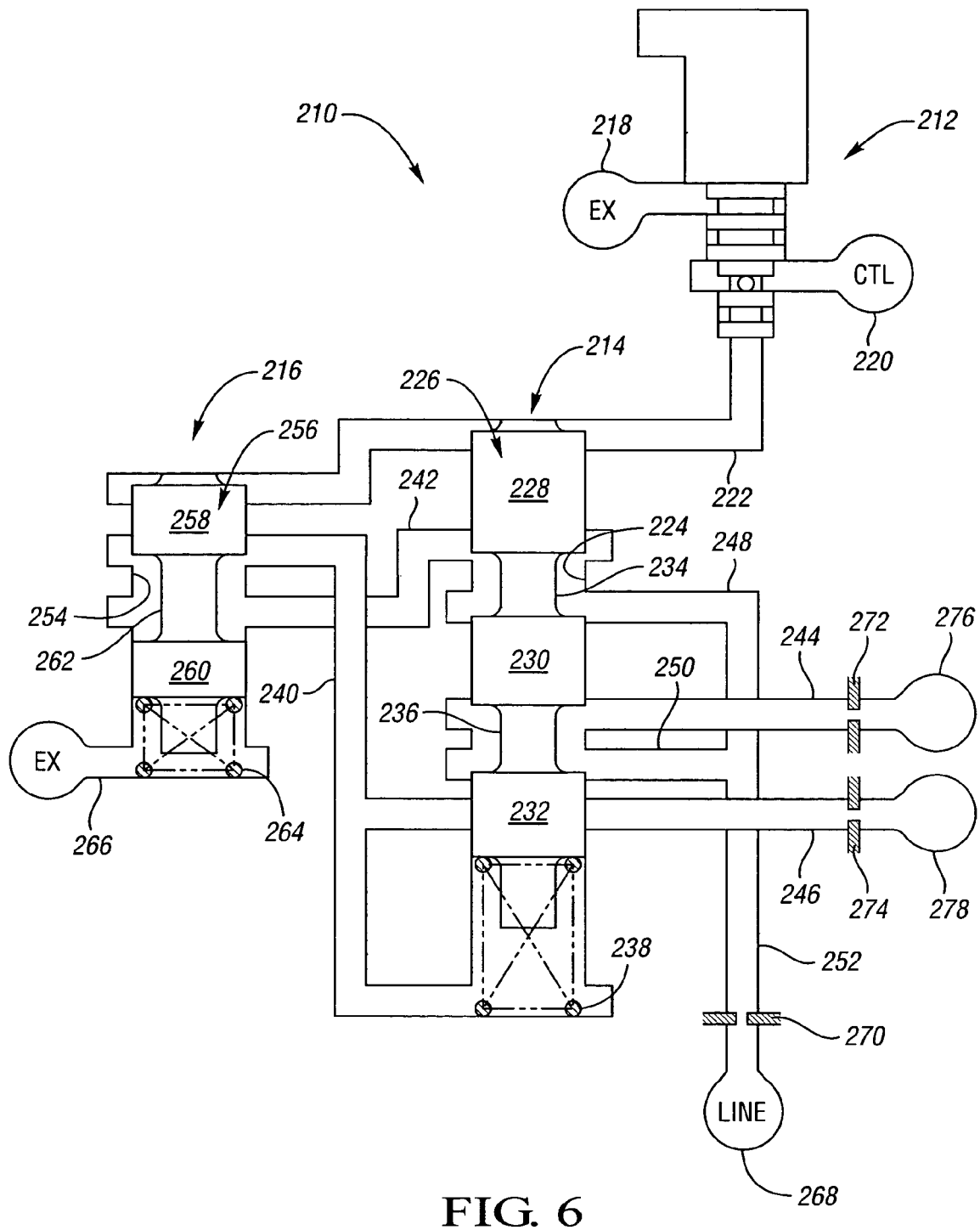
FIG. 6 is a schematic diagram showing an alternate embodiment of the variable motor/generator cooling system for an electrically variable hybrid vehicular transmission illustrating an engine on, high flow cooling to motor/generator A and motor/generator B operating condition.

FIG. 6 shows a variable motor/generator cooling system 210 for an electrically variable hybrid vehicular transmission illustrating the engine on, high flow cooling to the motor/generator A 276 and the motor/generator B 278 mode of operation. In this mode, the solenoid valve 212 will not permit fluid from the control pressure source 220 to pressurize the control passage 222. As a result, the valve spool 226 of the regulator valve 214 and the valve spool 256 of the relay valve 216 will remain biased in the spring set position. To effect cooling of the motor/generator A 276, pressurized fluid from the line pressure source 268 will traverse orifice 270 and enter the line pressure source passage 252. The fluid will subsequently flow into branch 250 and traverse valley 236, thereafter entering the motor/generator A cooling feed passage 244. The pressurized fluid must then traverse the orifice 272 prior to entering the motor/generator A 276.

To effect cooling of the motor/generator B 278, pressurized fluid within the branch 248 is communicated to the relay valve second passage 242 via the valley 234. The valley 262 of the valve spool 256 will allow pressurized fluid to flow from the relay valve second passage 242 into the relay valve first passage 240. The pressurized fluid will then flow around the land 232 of the valve spool 226, and into the motor/generator B cooling passage 246. The orifice 274 provides a measure of flow control for the pressurized fluid entering the motor/generator B 278. Fluid pressure from the relay valve first passage 240 acting upon the underside of land 232 of the valve spool 226 will ensure that the valve spool 226 will remain in the spring set position.

Those skilled in the art will recognize that the fluid flow rate to the motor/generator A 276 and the motor/generator B 278 may be varied by increasing or decreasing the fluid pressure within the line pressure source 268 as well as increasing or decreasing the size of orifices 270, 272, and 274.

Figure 7:
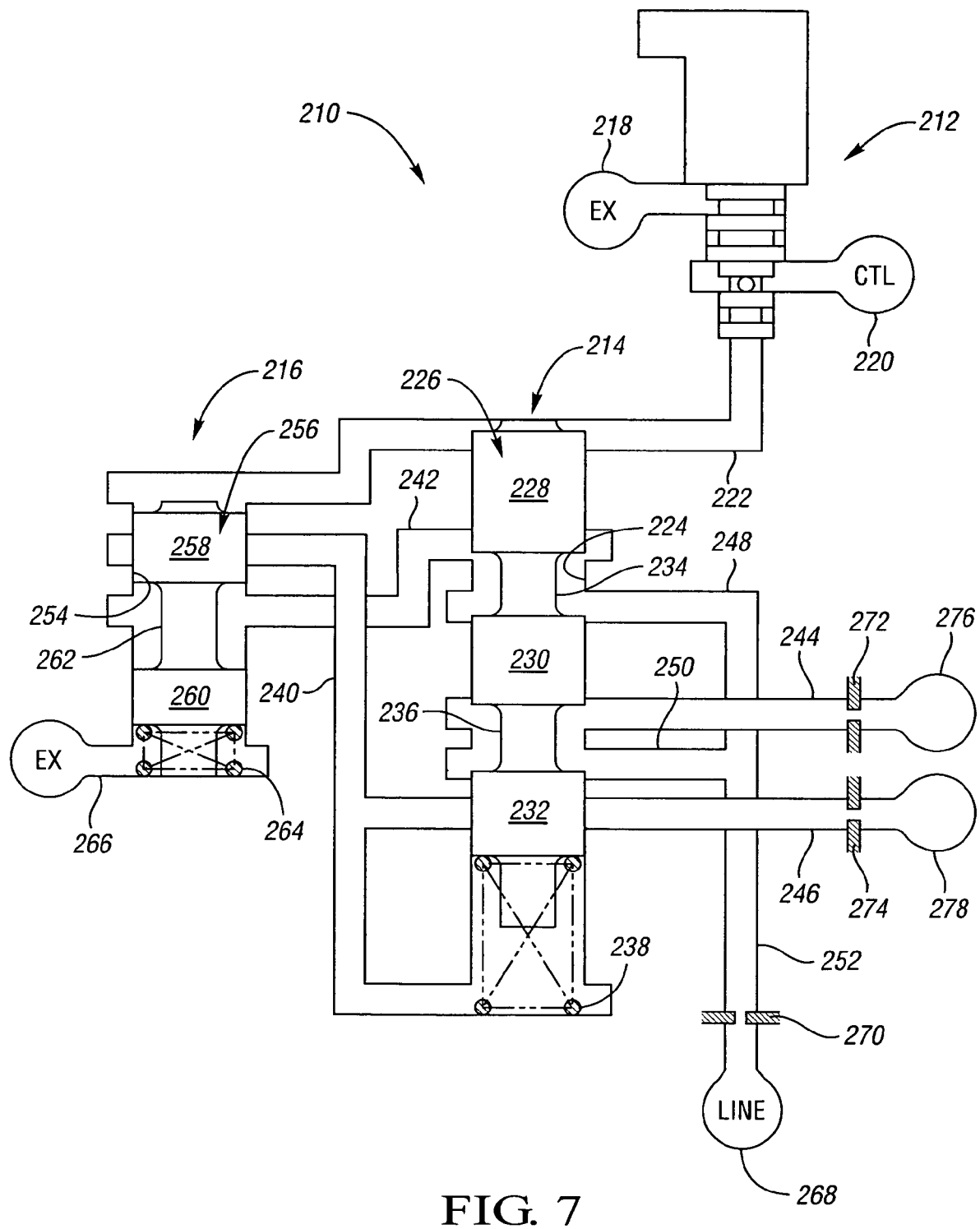
FIG. 7 is a schematic diagram showing an alternate embodiment of the variable motor/generator cooling system for an electrically variable hybrid vehicular transmission illustrating an engine on, high flow cooling to motor/generator A and no cooling to motor/generator B operating condition.

Engine On—High Cooling Flow to Motor/Generator A and No Cooling Flow to Motor/Generator B FIG. 7 shows a variable motor/generator cooling system 210 for an electrically variable hybrid vehicular transmission illustrating the engine on, high flow cooling to the motor/generator A 276 and no cooling to the motor/generator B 278 mode of operation. As the solenoid valve 212 actuates to allow greater communication of pressurized fluid between the control pressure source 220 and the control passage 222, the valve spool 256 will bias against the spring 264. When the fluid pressure within the control passage 222 is of sufficient magnitude to overcome the spring force exerted by the spring 264, the valve spool 256 will move to a pressure set position, as shown in FIGS. 7 through 10. In this position, the land 258 of the valve spool 256 will block the relay valve first passage 240 thereby interrupting fluid flow to the motor/generator B feed passage 246. The fluid pressure within the control passage 222 is of insufficient magnitude to overcome the spring force exerted on the valve spool 226 by the spring 238. Therefore, the valve spool 226 will remain in the spring set position.

Additionally, pressurized fluid within the relay valve second passage 242 will become trapped within the valley 262, thereby disallowing the flow of fluid within the relay valve second passage 242. The pressurized fluid within the line pressure source passage 252 will flow into branch 250 and subsequently into the motor/generator A cooling feed passage 244, via valley 236, where the fluid must traverse the orifice 272 prior to entering the motor/generator A 276. This mode of operation will provide the maximum amount of fluid flow to the motor/generator A 276 and no fluid flow to the motor/generator B 278.

Engine On—Proportional Cooling Flow to Motor/Generator A and Motor/Generator B

Figure 8:
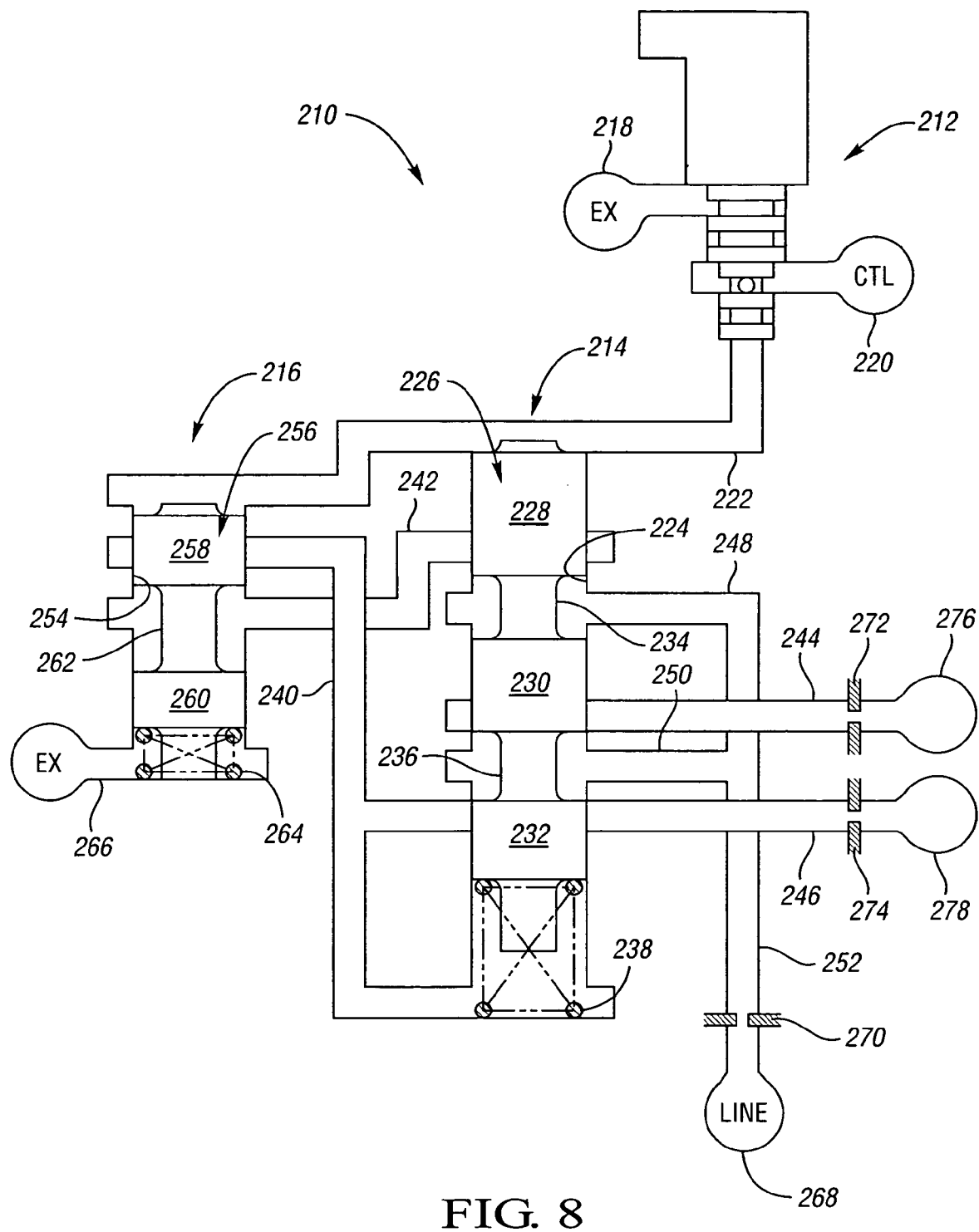
FIG. 8 is a schematic diagram showing an alternate embodiment of the variable motor/generator cooling system for an electrically variable hybrid vehicular transmission illustrating an engine on, proportional cooling between motor/generator A and motor/generator B operating condition.

FIG. 8 shows a variable motor/generator cooling system 210 for an electrically variable hybrid vehicular transmission illustrating a proportional cooling between the motor/generator A 276 and the motor/generator B 278 mode of operation. As the solenoid valve 212 actuates to allow greater communication of pressurized fluid between the control pressure source 220 and the control passage 222, the fluid pressure within the control passage 222 will eventually be of a sufficient magnitude to overcome the spring force exerted on the valve spool 226 by the spring 238. The valve spool 226 will bias against the spring 238 and move within the bore 224 of the regulator valve 214 until it reaches a pressure regulation point, as shown in FIG. 8.

In this position, the valley 236 will communicate the pressurized fluid within the branch 250 of the line pressure source passage 252 proportionately between the motor/generator A cooling feed passage 244 and the motor/generator B cooling feed passage 246. By varying the fluid pressure within the control passage 222, the valve spool 226 will vary the proportion of fluid that flows to the motor/generator A 276 and the motor/generator B 278. Those skilled in the art will recognize that the proportional fluid distribution characteristic can be adjusted by varying the geometric characteristics of the valve spool 226 and the orifices 270, 272, and 274. Additionally, as the valley 236 allows fluid communication between the branch 25 and the relay valve first passage 240, the relay valve first passage 240 will provide a pressure feedback signal to the underside of the land 232 to balance the forces acting on the valve spool 226.

Figure 9:
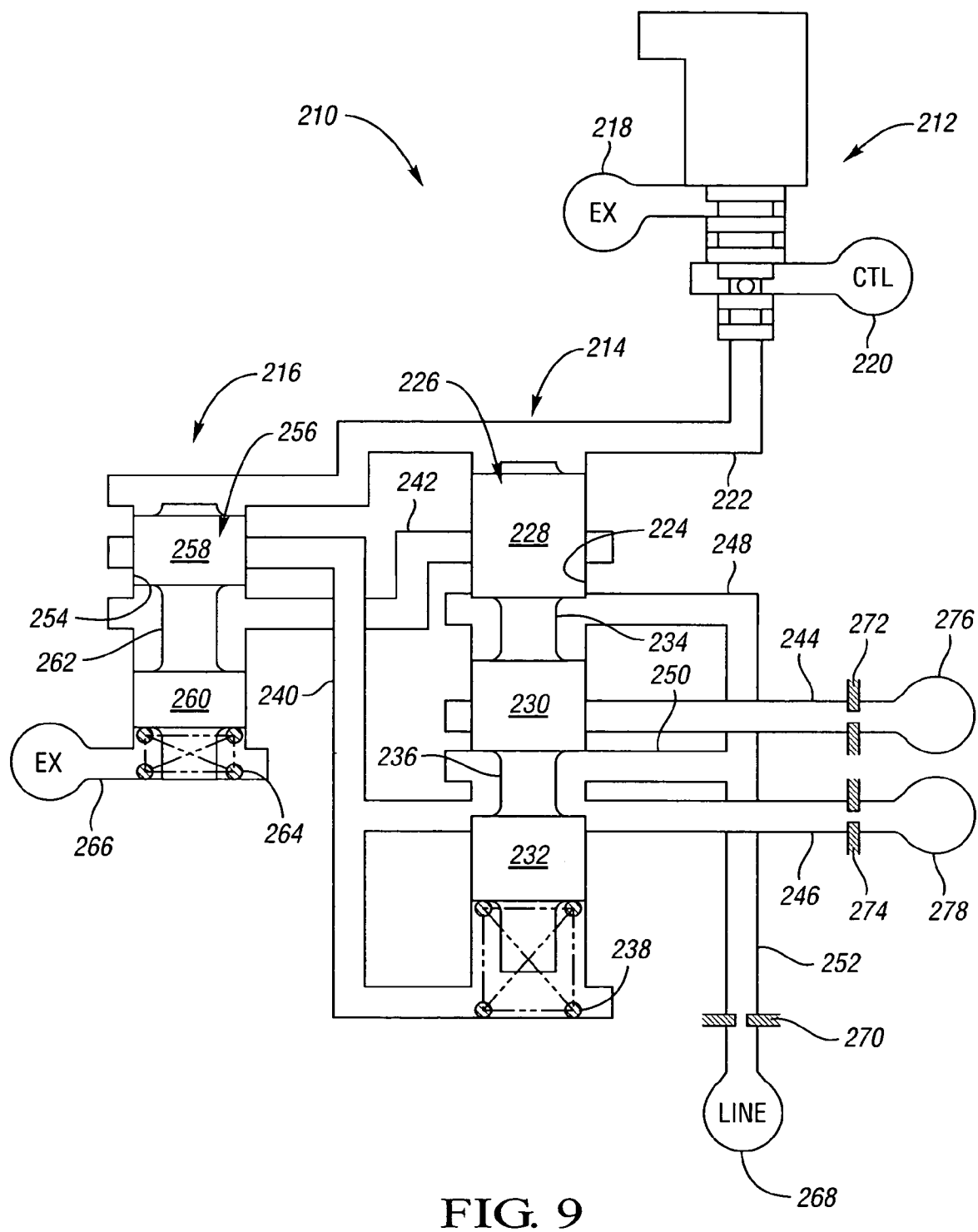
FIG. 9 is a schematic diagram showing an alternate embodiment of the variable motor/generator cooling system for an electrically variable hybrid vehicular transmission illustrating an engine on, no cooling to motor/generator A and high flow cooling to motor/generator B operating condition.

Engine On—No Cooling Flow to Motor/Generator A and High Cooling Flow to Motor/Generator B FIG. 9 shows a variable motor/generator cooling system 210 for an electrically variable hybrid vehicular transmission illustrating a no cooling to motor/generator A 276 and high flow cooling to motor/generator B 278 mode of operation. As the solenoid valve 212 actuates to provide the control passage 222 with a fluid pressure greater than that of the feedback pressure signal operating on the land 232, the valve spool 226 will bias against the spring 238 to an even greater extent, as shown in FIG. 9. The position of the valve spool 226 within the valve bore 224 will cause the land 230 to block fluid flow to the motor/generator A cooling feed passage 244. In doing so, the fluid flow to the motor/generator A 276 is discontinued. The fluid flow rate to the motor/generator B 278 will increase as the pressurized fluid within the branch 250 is now communicated to the motor/generator B cooling feed passage 246 via the valley 236.

Figure 10:
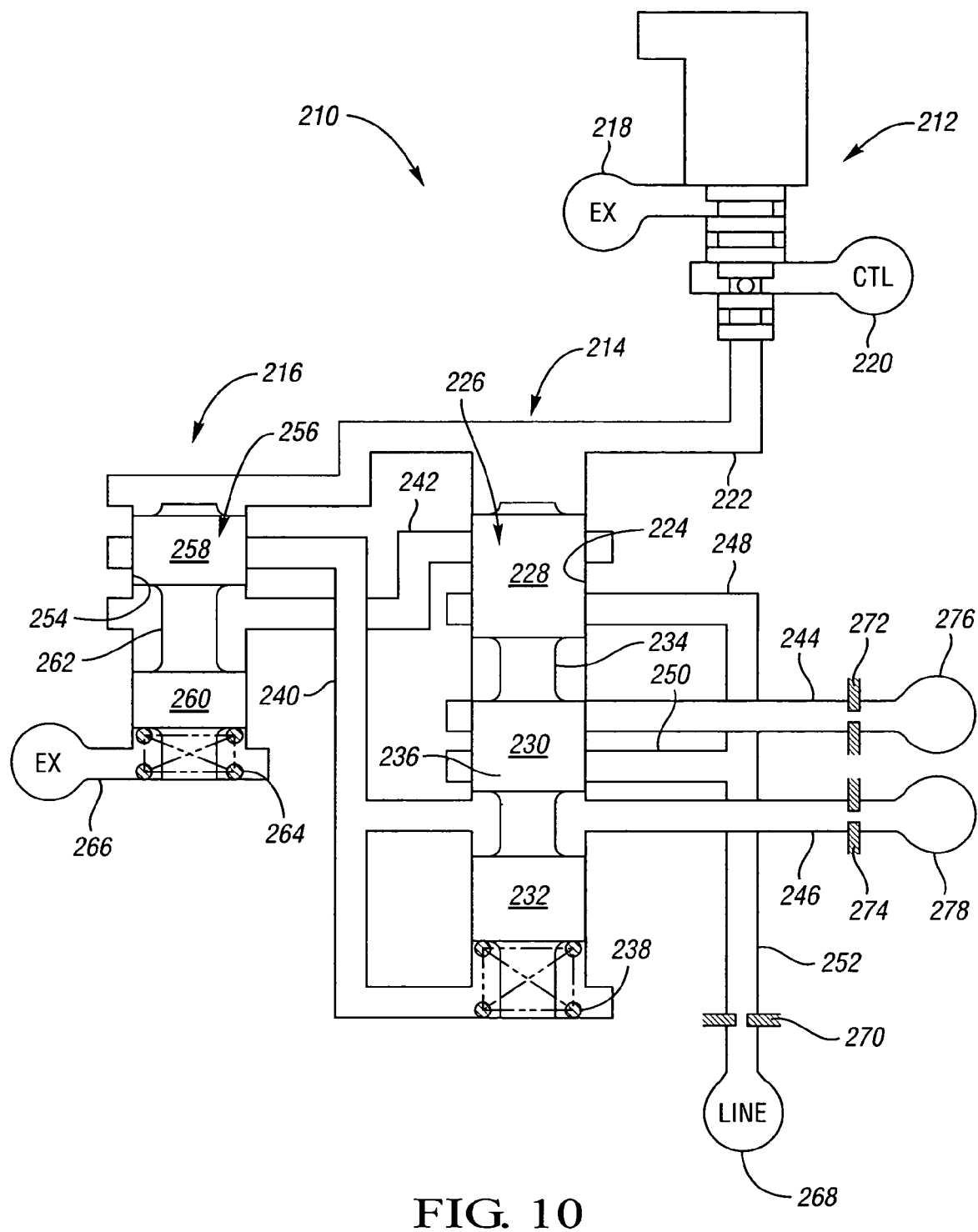
FIG. 10 is a schematic diagram showing an alternate embodiment of the variable motor/generator cooling system for an electrically variable hybrid vehicular transmission illustrating an engine on, no cooling to motor/generator A and no cooling to motor/generator B operating condition.

Engine On—No Cooling Flow to Motor/Generator A and No Cooling Flow to Motor/Generator B FIG. 10 shows a variable motor/generator cooling system 210 for an electrically variable hybrid vehicular transmission illustrating an engine on, no cooling to the motor/generator A 276 and no cooling to the motor/generator B 278 mode of operation. As the solenoid valve 212 actuates to allow the maximum fluid communication between the control pressure source 220 and the control passage 222, the valve spool 226 will bias against the spring 238 and move to a pressure set position, as shown in FIG. 10. In this position, the lands 228 and 230 of the valve spool 226 will operate to block fluid flow from both branches 248 and 250, respectively, of the line pressure source passage 252. Thus, fluid flow to the motor/generator A cooling feed passage 244 and the motor/generator B cooling feed passage 246, and ultimately to the motor/generator A 276 and the motor/generator B 278 will be disallowed.

By providing multiple modes of motor/generator cooling, multiple motor/generator assemblies may be independently cooled at varying rates depending on the duty cycle of each motor/generator. Increases in efficiency may be achieved though reduced pump loads and spin losses by selectively controlling the fluid flow to effect the cooling of each motor/generator While the best modes for carrying out the invention have been described in detail, those familiar with the art to which this invention relates will recognize various alternative designs and embodiments for practicing the invention within the scope of the appended claims.

The invention claimed is:

1. A variable motor/generator cooling control system for an electrically variable hybrid vehicular transmission comprising:
    a solenoid valve;
    a line pressure source of pressurized fluid;
    at least one motor/generator;
    at least one relay valve, having a first position and a second position being controlled by said solenoid valve, and operable to selectively distribute said pressurized fluid from said line source to said at least one motor/generator for cooling;
    wherein said solenoid valve controls said at least one relay valve by selectively variably pressurizing a control passage; and
    a multiplex valve having a first position and a second position, wherein said multiplex valve is operable to selectively distribute said pressure within said control passage to said at least one relay valve when said multiplex valve is in said first position, and to selectively distribute said pressure within said control passage to a damper trim valve when said multiplex valve is in said second position.

2. The variable motor/generator cooling control system of claim 1, wherein said at least one motor/generator is in selective fluid communication with said relay valve via a motor/generator feed passage having a plurality of branches of varying restriction.

3. The variable motor/generator cooling control system of claim 1, wherein said solenoid valve is a variable pressure type valve.

4. The variable motor/generator cooling control system of claim 2, wherein said relay valve communicates said pressurized fluid from said line pressure source at one flow rate to said at least one motor/generator via one of said plurality of branches when said relay valve is in said first position, and said relay valve distributes said pressurized fluid from said line pressure source at another flow rate to said at least one motor/generator via another of said plurality of branches when said relay valve is in said second position.

5. The variable motor/generator cooling control system of claim 2, wherein the restriction in said plurality of branches is provided by orifices disposed therein.

6. The variable motor/generator cooling control system of claim 2, wherein said plurality of branches includes a first branch and a second branch, said first branch having no orifice, said second branch having multiple orifices, and said motor/generator feed passage having a single orifice.

7. A variable motor/generator cooling control system for an electrically variable hybrid vehicular transmission comprising:
    at least one motor/generator;
    a line pressure source of pressurized fluid;
    at least one relay valve operable to provide said pressurized fluid from said line pressure source to said at least one motor/generator for cooling;
    a solenoid valve operable to control said relay valve by selectively variably pressurizing a control passage; and
    a multiplex valve disposed between, and in selective fluid communication with said solenoid valve and said at least one relay valve.

8. The variable motor/generator cooling control system of claim 7 further comprising:
    a regulator valve disposed between, and in selective fluid communication with, said at least one motor/generator and said at least one relay valve.

9. The variable motor/generator cooling control system of claim 7, wherein said solenoid valve is a variable pressure type valve.

* * * * *